United States Patent
Pruss et al.

(10) Patent No.: US 9,509,549 B2
(45) Date of Patent: Nov. 29, 2016

(54) EXTENDING ROUTING RULES FROM EXTERNAL SERVICES

(71) Applicant: CISCO TECHNOLOGY, INC., San Jose, CA (US)

(72) Inventors: Richard M. Pruss, Queensland (AU); John Edward McDowall, Redwood City, CA (US); Jan Medved, Pleasanton, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 549 days.

(21) Appl. No.: 13/842,786

(22) Filed: Mar. 15, 2013

(65) Prior Publication Data

US 2014/0280835 A1    Sep. 18, 2014

(51) Int. Cl.
G06F 15/16 (2006.01)
H04L 12/24 (2006.01)
H04L 12/26 (2006.01)
H04L 12/715 (2013.01)

(52) U.S. Cl.
CPC ....... *H04L 41/0226* (2013.01); *H04L 41/0206* (2013.01); *H04L 41/0813* (2013.01); *H04L 41/0896* (2013.01); *H04L 43/028* (2013.01); *H04L 45/64* (2013.01)

(58) Field of Classification Search
CPC .............. H04L 29/12066; H04L 41/0816; H04L 63/0227; G06Q 10/10; G06F 9/44
USPC ........ 709/223, 224, 246, 395; 370/389, 392, 370/395, 396
See application file for complete search history.

(56) References Cited

U.S. PATENT DOCUMENTS

| | | | |
|---|---|---|---|
| 7,633,949 B2 * | 12/2009 | Zadikian et al. | 370/396 |
| 7,653,735 B2 * | 1/2010 | Mandato | H04L 12/5695 709/205 |
| 8,069,435 B1 * | 11/2011 | Lai | 717/106 |
| 8,800,009 B1 * | 8/2014 | Beda et al. | 726/6 |
| 8,948,001 B2 * | 2/2015 | Guichard et al. | 370/218 |
| 9,215,093 B2 * | 12/2015 | Han | H04L 12/4633 |
| 9,252,972 B1 * | 2/2016 | Dukes | H04L 49/70 |
| 2003/0174731 A1 * | 9/2003 | Tafazolli | H04L 29/06 370/469 |
| 2005/0125804 A1 * | 6/2005 | Dievendorff et al. | 719/315 |
| 2006/0013217 A1 * | 1/2006 | Datla et al. | 370/389 |
| 2006/0149962 A1 * | 7/2006 | Fountain | H04L 63/0428 713/151 |
| 2008/0043764 A1 * | 2/2008 | Ishizaki et al. | 370/401 |

(Continued)

OTHER PUBLICATIONS

Kassler, Towards QoE-driven Multimedia Service Negotiation and Path Optimization with Software Defined Networking, Sep. 11, 2012.*

(Continued)

*Primary Examiner* — Dhairya A Patel
(74) *Attorney, Agent, or Firm* — Patterson + Sheridan, LLP (57) ABSTRACT

Techniques are disclosed to extend routing rules from external services. A request is received to modify a specified rule in a network element of a network. The specified rule governs disposition of a network flow specific to an application. The request is received via a communications channel configured to expose an application programming interface (API) to the application. The request is interpreted at a network abstraction layer of the network element. The request is converted into a command at a service implementation layer of the network element. The command is executed to modify the specified rule in the network element, responsive to the request.

20 Claims, 7 Drawing Sheets

(56) References Cited

U.S. PATENT DOCUMENTS

| | | | | |
|---|---|---|---|---|
| 2009/0262741 | A1* | 10/2009 | Jungck et al. | 370/392 |
| 2011/0022812 | A1* | 1/2011 | van der Linden et al. | 711/163 |
| 2013/0058351 | A1* | 3/2013 | Casado et al. | 370/400 |
| 2013/0060929 | A1* | 3/2013 | Koponen et al. | 709/224 |
| 2013/0227561 | A1* | 8/2013 | Walsh | G06F 9/455 718/1 |
| 2013/0318029 | A1* | 11/2013 | Sridharan et al. | 706/59 |
| 2014/0215036 | A1* | 7/2014 | Elzur | H04L 49/50 709/223 |
| 2014/0269716 | A1* | 9/2014 | Pruss et al. | 370/392 |
| 2015/0236968 | A1* | 8/2015 | Zhang | H04L 63/1416 370/230 |

OTHER PUBLICATIONS

"Software-Defined Networking: The New Norm for Networking," Apr. 13, 2012, retrieved Apr. 29, 2014 from http://www.opennetworking.org/images/stories/dowloads/sdn-resources/white-papers/wp-sdn-newnorm.pdf (whole document).

Andreas Kassler, et al. "Towards QoE-driven Multimedia Service Negotiation and Path Optimization with Software Defined Networking," Software Telecommunications and Computer Networks (Softcom), 2012 IEEE International Conference (Sep. 11, 2012), pp. 1-5.

PCT International Search Report and Written Opinion for PCT/US201/020817, dated Jun. 10, 2014.

LBaaS proposal, Google Drive, 2014, <https://docs.google.com/document/pub?id=1DRgQhZJ73EyzQ2KvzVQd7Li9YEL7fXWBp8reMdAEhiM>.

Elastic Load Balancing, amazon web services, 2014, Amazon Web Services, Inc., Hernon, United States, <http://aws.amazon.com/elasticloadbalancing/>.

Amazon Route 53, amazon web services, 2014, Amazon Web Services, Inc., Hernon, United States, <http://aws.amazon.com/route53/>.

* cited by examiner

EXTENDING ROUTING RULES FROM EXTERNAL SERVICES

TECHNICAL FIELD

Embodiments presented in this disclosure generally relate to network systems. More specifically, embodiments disclosed herein relate to techniques for extending routing rules from external services.

BACKGROUND

Networks have not traditionally been programmable entities. Although some programming frameworks may be used to configure a limited aspect of a network, the intelligence has been in the framework, and not the network. In this regard, any programmability exists in the framework rather than in each switch or router of the network. As networks become more complex and the need for the networks to respond to external changes in near real-time becomes increasingly important, approaches of configuring networks at individual devices may become impractical.

BRIEF DESCRIPTION OF THE DRAWINGS

So that the manner in which the above-recited features in the present disclosure can be understood in detail, a more particular description of embodiments in the disclosure, briefly summarized above, may be had by reference to embodiments, some of which are illustrated in the appended drawings. It is to be noted, however, that the appended drawings illustrate only typical embodiments presented in this disclosure and are therefore not to be considered limiting of its scope, for the disclosure may admit to other equally effective embodiments.

DESCRIPTION

Overview

Embodiments presented in this disclosure provide a computer-implemented method that includes receiving a request to modify a specified rule enforced by at least one network element of a software-defined networking (SDN)-enabled network. The specified rule governs disposition of a network flow specific to an application. The request is received via a predefined communications channel configured to expose a predefined application programming interface (API) to the application. The method also includes interpreting the request at a network abstraction layer of the at least one network element. The method also includes converting the request into one or more commands at a service implementation layer of the at least one network element. The method also includes executing the one or more commands, to modify the specified rule enforced by the at least one network element, responsive to the request.

Other embodiments presented in this disclosure provide a computer-readable medium containing a program which, when executed, performs an operation that includes receiving a request to modify a specified rule enforced by at least one network element of a software-defined networking (SDN)-enabled network. The specified rule governs disposition of a network flow specific to an application. The request is received via a predefined communications channel configured to expose a predefined application programming interface (API) to the application. The operation also includes interpreting the request at a network abstraction layer of the at least one network element. The operation also includes converting the request into one or more commands at a service implementation layer of the at least one network element. The operation also includes executing the one or more commands, to modify the specified rule enforced by the at least one network element, responsive to the request.

Still other embodiments presented in this disclosure provide a system that includes one or more processors and a memory containing a program which, when executed by the one or more processors, is confirmed to perform an operation that includes receiving a request to modify a specified rule enforced by at least one network element of a software-defined networking (SDN)-enabled network. The specified rule governs disposition of a network flow specific to an application. The request is received via a predefined communications channel configured to expose a predefined application programming interface (API) to the application. The operation also includes interpreting the request at a network abstraction layer of the at least one network element. The operation also includes converting the request into one or more commands at a service implementation layer of the at least one network element. The operation also includes executing the one or more commands, to modify the specified rule enforced by the at least one network element, responsive to the request.

DESCRIPTION OF EXAMPLE EMBODIMENTS

One fast-growing business sector, particular in the space of cloud services, is "as-a-service"-type offerings. Such offerings may often be network-related, such as load-balancing-as-a-service, virtual private network (VPN)-as-a-service, and firewall-as-a-service. Such services may often be custom services having custom software and possibly also custom hardware. To provide such services on network devices, such as on the switches and routers of a network, may improve utility and adaptability of the network at least in some cases. In some embodiments and from an even broader perspective, a framework is provided to generally allow third-party code to interact with and run on the network devices, thereby allowing for custom applications for the network. The framework may include an application architecture configured to support extending routing rules from external services according to techniques presented in this disclosure. The application architecture may also be referred to as an external routing extension architecture. At least in some embodiments, the framework may also run on enterprise-grade hardware and support manipulation of flows via third-party code. The framework may be provided as part of a software defined networking (SDN)-enabled network.

At least in some embodiments, SDN techniques allow a network, traditionally a static entity, to become more dynamic in nature. SDN opens networks to application developers, who may write applications to manage network elements and data flows passing through a network element, without requiring physical access to the network elements themselves. Thus, rather than a network element being a fixed-function "appliance," SDN considers network hardware to be part of a distributed computational system that can be manipulated by software. An application developer writing applications for an SDN may execute the application "in the network," which may include any device which processes data flows between computing systems, e.g., a switching or routing element connecting host systems to a network (and devices connecting one computing network to another), as well as other computing devices able to execute the application while connected to the network. The application may execute commands and apply functions to the network devices (and the data flows) remotely or locally on the network element itself. Using applications in an SDN, developers may manage networking functions of a network element, such as routing, quality of service (QoS), and bandwidth allocation, as well as manage performance and/or properties the network elements themselves. Additionally, different programming logic may be applied to different flows or packets in the same network topology, such that each network graph need not have its own instance of the SDN application.

In some embodiments, SDN provides additional flexibility and solidarity relative to conventional networks. Using an SDN controller, which may be either centrally located or located on the respective network devices, a network administrator can configure the control plane and dictate how the network devices route data. For example, the network administrator may assign criteria or SDN rules that, when satisfied, instruct the network device to perform a specific action on the received packet—e.g., drop the packet, forward the packet to a particular network device, evaluate the packet using an application on the network device, and the like. In one embodiment, the SDN controller configures the routing table or forwarding table (i.e., forwarding information base) in a network device based on the network administrator's preferences.

Figure 1:
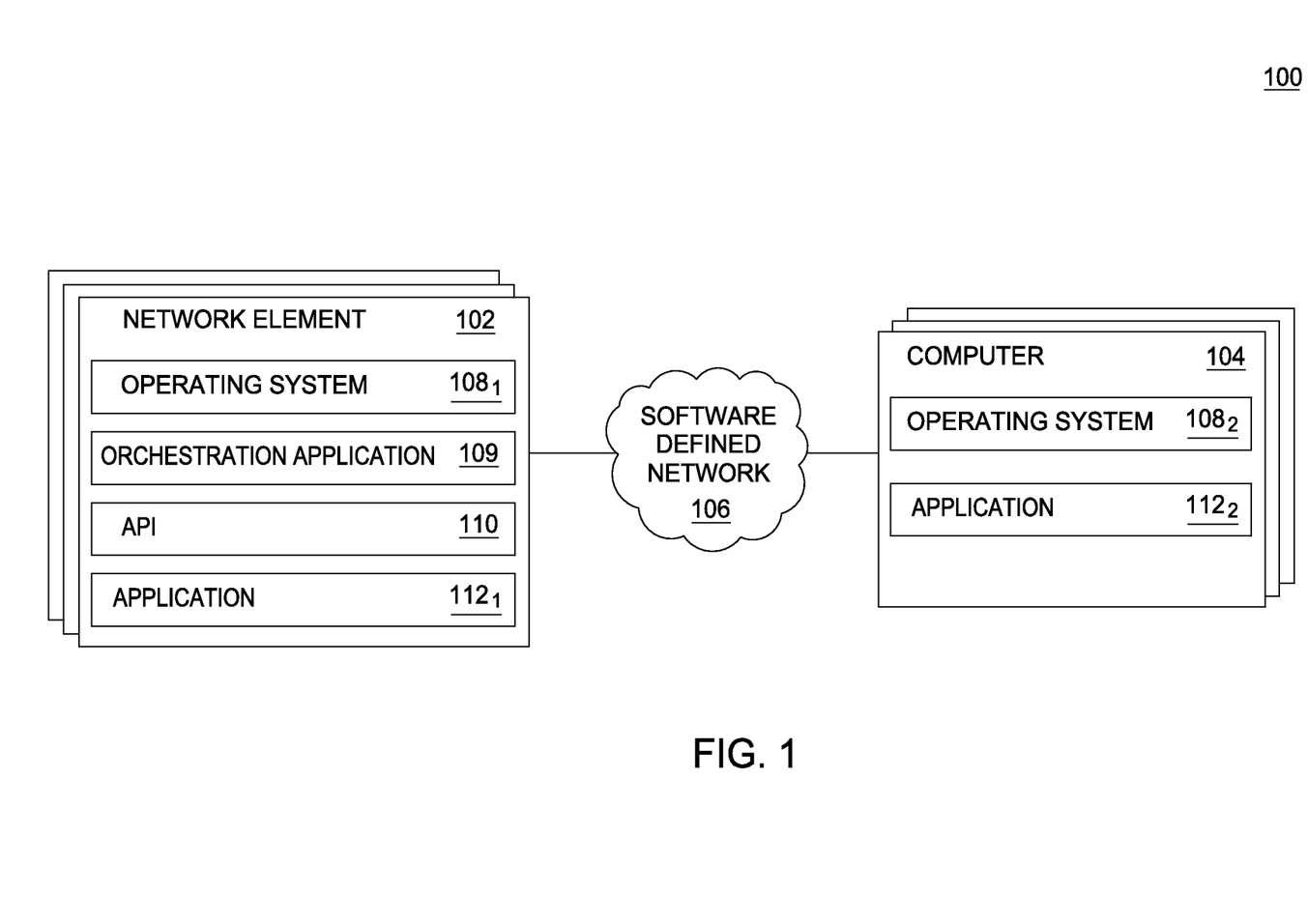
FIG. 1 is a block diagram illustrating a networked system to extend routing rules from external services, according to one embodiment presented in this disclosure.

FIG. 1 is a block diagram illustrating a networked system 100 to extend routing rules from external services, according to one embodiment presented in this disclosure. As shown, the networked environment 110 includes network elements 102 operatively connected to computers 104 via a network. In this particular example, the network is an SDN-enabled network 106, also referred to herein as a software defined network. In some embodiments, the network elements 102 may also support SDN, because the network elements 102 may be configured to execute containerized applications thereon. Depending on the embodiment, the network elements 102 and computers 104 may be physical or virtual and may provide any types of cloud computing services to one or more end-users. Each network element 102 and each computer 104 may execute a respective operating system 108.

As described above, in one embodiment, an application architecture is provided to support extending routing rules from external services. The application architecture may include an orchestration application 109. In one embodiment, the orchestration application 109 is configured to orchestrate automation and programmability of the network elements 102 in the SDN-enabled network 106. The orchestration application 109 may provide at least one API 110 to abstract any implementation specific details of the network elements 102 in the SDN-enabled network 106. Stated differently, the at least one API 110 of the orchestration application 109 are abstraction tools to permit a developer or network administrator to access and monitor different functions and outputs of the network elements 102 in the SDN-enabled network 106. Accordingly, the at least one API 110 may be configured to allow manipulation of management and runtime aspects of the network elements 102. By using the orchestration application 109 and the at least one API 110, functional programming techniques may be used to program a wide range of network elements 102, regardless of the wide array of distinctions that may be found between specific network elements 102. For example, the orchestration application 109 may provide an interface to allow the application 112, to read, write, and modify a routing table and routing engine of a network element 102.

In one embodiment, the at least one API 110 is an integrated component of the orchestration application 109 or the application 112. In one embodiment, the at least one API 110 is configured to gather data associated with the different functions of the network elements 102, such as statistics associated with the network element, routing tables, status of the network elements, topology information, errors, etc. Further, the at least one API may also permit a developer or network administrator to control functions of the network elements 102, such as to change settings in the forwarding engine, change the state of the network elements 102, etc. The application 112 may thus use the at least one API 110 to send commands to the network elements 102.

In one embodiment, each computer 104 is configured to execute the application 112, which is configured to use the functionality of the at least one API 110 provided by the orchestration application 109 and in order to modify the behavior of the network elements 102, such as routing behavior. By abstracting details of the network elements 109 using the at least one API 110, a developer or network administrator may more readily and efficiently monitor and control different types of network elements 102 at least in some cases, regardless of the proprietary firmware used by each type of network element 102. At least in some embodiments, such functionality may be permitted or facilitated via a software development kit (SDK) associated with the API 110. An example of the SDK is the One Platform Kit (onePK) software development kit (SDK) available from Cisco Systems® of San Jose, Calif. In some embodiments, the application 112 may additionally use the SDK, which provides programmatic access to functionality of the network element 102 from an external device such as the computer 104. In providing an application architecture that includes the API 110 and the associated SDK according to the techniques disclosed herein, routing rules may be more readily and efficiently extended from external services such as the application 112 at least in some cases.

Figure 2A:
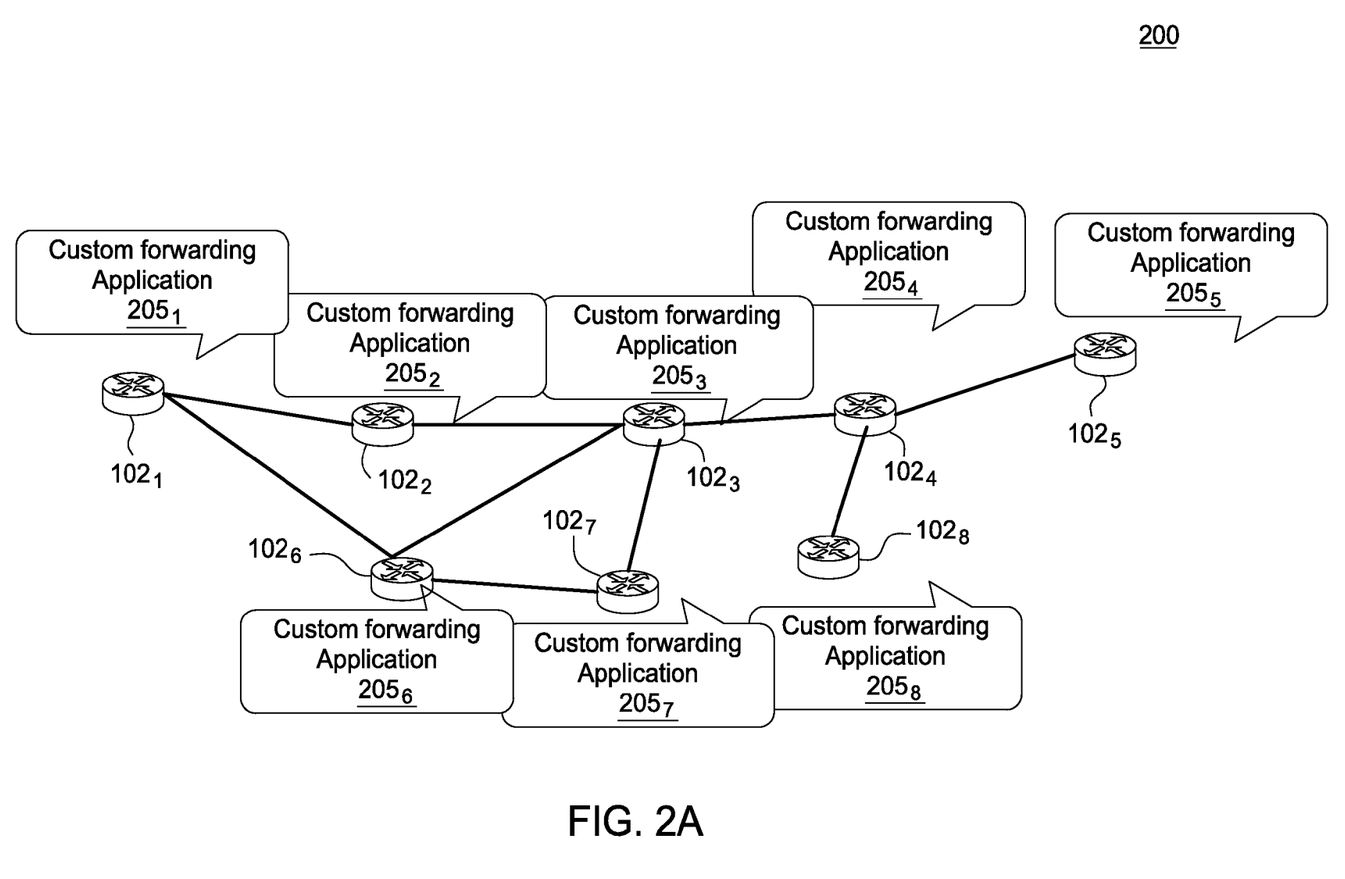
FIGS. 2A-2B are block diagrams illustrating networked systems to extend routing rules from external services, according to some embodiments presented in this disclosure.
Figure 2B:
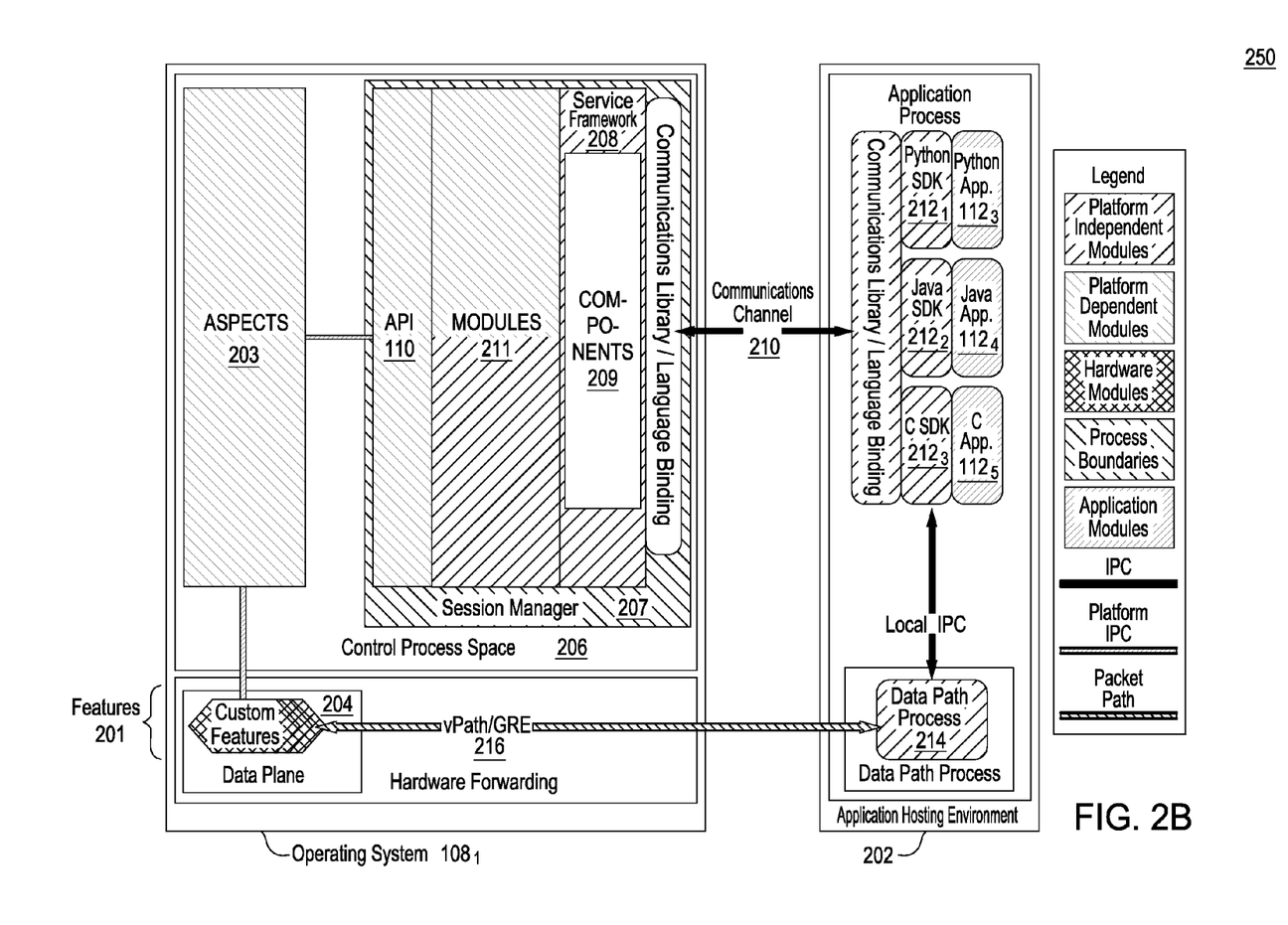

FIGS. 2A-2B are block diagrams illustrating networked systems 200, 250 to extend routing rules from external services, according to some embodiments presented in this disclosure. As shown in FIG. 2A, the networked system 200 includes network elements $102_{1-8}$ and custom forwarding applications $205_{1-8}$. In one embodiment, each custom forwarding application $205_{1-8}$ controls forwarding of packets based on information shared with the respective custom forwarding application $205_{1-8}$ by an external service. In some embodiments, the external service may include a custom communication protocol between nodes on the networked system 200. In other embodiments, the external service may be a central route management system. In some embodiments, rather than merely having a control plane for forwarding, embodiments disclosed herein additionally or alternatively provide an ability to load, as routing extensions to a current routing system, any desired component of the routing system, such as a desired forwarding classification system or a desired control plane communication system. Consequently, even a fully experimental protocol may be loaded and run on an existing, running network at least in some embodiments.

As shown in FIG. 2B, the networked system 250 includes the operating system $108_1$ of the network element 102 of FIG. 1. The operating system $108_1$ includes a hardware data plane 204 that may be manipulated by a control process space 206, also referred to herein as a management runtime. In one embodiment, the control process space 206 is extended to include the API 110 in a session manager 207, to allow manipulation of each management and runtime aspect 203 of predefined features 201 of the network element 102. Examples of such aspects 203 include discovery, topology, element, interface, external configuration, system log, trace/logging, authentication, authorization and accounting (AAA), Cisco Discovery Protocol (CDP), routing, QoS, access control list (ACL), external service, and datapath policy.

In some embodiments, each API 110 has a corresponding module 211 in the session manager 207. Examples of modules include interface, tracing, routing, QoS, ACL, policy, and other, custom modules. The modules 211 may include platform-dependent modules and platform-independent modules. The underlying capabilities of the API 110 may be coordinated into a service framework 208 of the session manager 207. The service framework 208 may be exposed via a communications channel 210 to the applications $112_{3-5}$ executing in an application hosting environment 202. An example of the communications channel 210 is a remote procedure call (RPC) channel such as Thrift, and examples of components 209 of the service framework 208 include session handler, pluggable transport, session event/high availability (HA), notification handler, locking service, version handler, access control, and service registry. In some embodiments, the RPC channel may be network-transparent.

In one embodiment, the applications $112_{3-5}$ may use an appropriate SDK $212_{1-3}$ that is configured to communicate over the communications channel and that is further configured to provide programmatic access to functionality of the network element 102 from an external device. In some embodiments, the SDK $212_{1-3}$ is configured to communicate with a data path process 214 via local inter-process communication (IPC), and the data path process 214 may access the features 201 via virtual network service data path (vPath) and/or generic routing encapsulation (GRE) 216. By providing the API 110 and the SDK 212 according to the techniques disclosed herein, third-party code, such as in the form of the application 112, may be executed in multi-tenant fashion on the networked system 250 and using the underlying management runtime of the network element 102.

Figure 3:
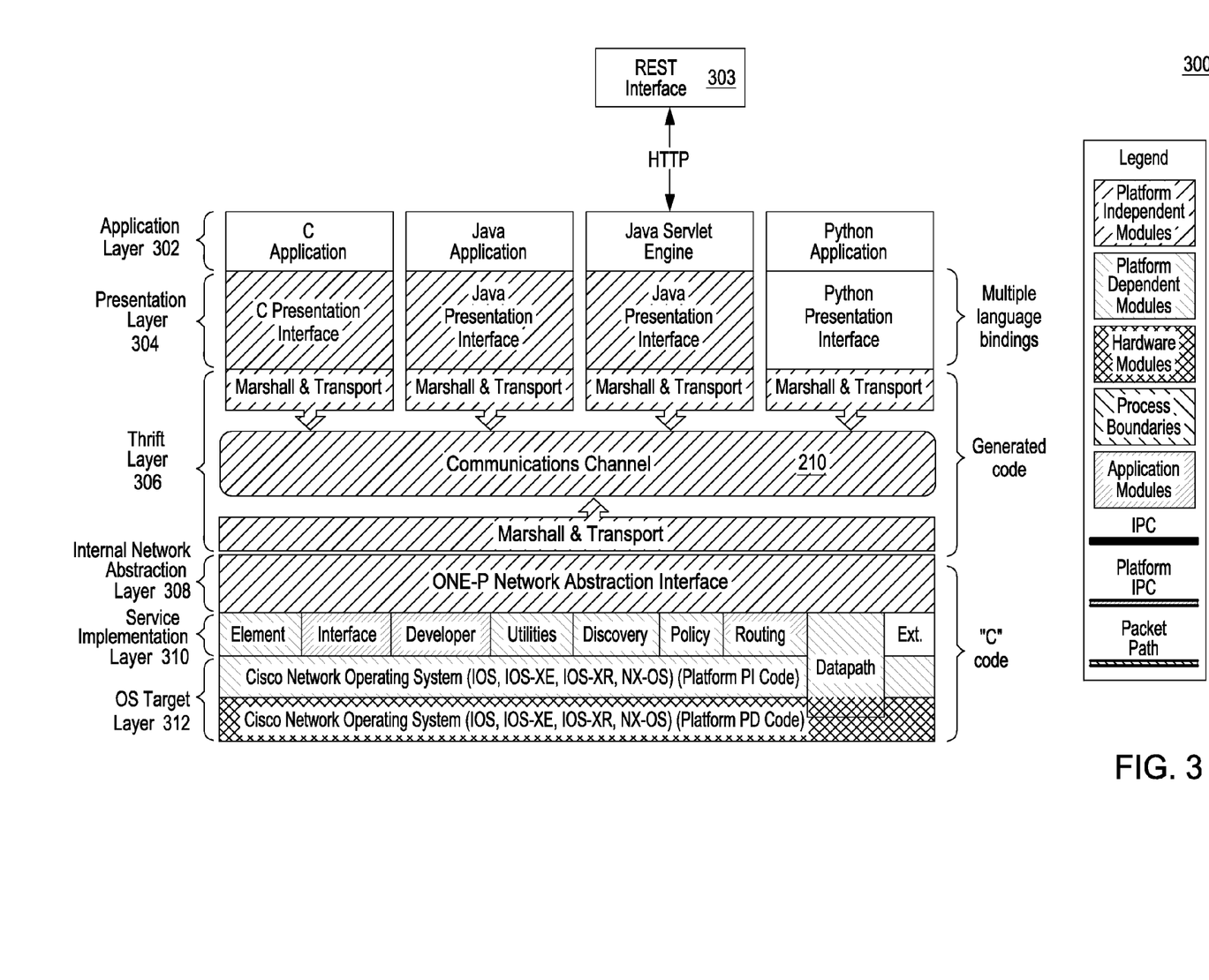
FIG. 3 is a block diagram illustrating a system architecture to extend routing rules from external services, according to one embodiment presented in this disclosure.

FIG. 3 is a block diagram illustrating a system architecture 300 to extend routing rules from external services, according to one embodiment presented in this disclosure. As shown, the system architecture 300 includes an application layer, 302, a presentation layer 304, a Thrift layer 306, an internal network abstraction layer 308, a service implementation layer 310, and an operating system (OS) target layer 312. The application layer 302 may include, without limitation, applications such as a C application, a Java application, a Java servlet engine operatively connected to a representational state transfer (REST) interface 303, and a Python application. The presentation layer 304 includes a respective presentation interface for each type of application. The Thrift layer 306 includes the communications channel 210 and code generated for marshaling and transport. The internal network abstraction layer 308, also referred to as a network abstraction layer, includes a network abstraction interface, which may include code for the components 209 and modules 211 of FIG. 2. The service implementation layer 310 includes code associated with the API 110 and for configuring aspects 203 of the network elements 102. The OS target layer 312 includes underlying, platform-dependent code that is specific to the type of the respective network element 102.

In one embodiment, the application 112 may be logically viewed as having three associated parts, including an input filter on the network element 102, the application 112 proper, also referred to as a controller, and a switching/routing element that is part of the data plane 204 and that is manipulable via the API 110. At least in some embodiments, the input filter is on an ingress port of the network element 102, and the switching/routing element directs packets or network flows to an appropriate egress port of the network element 102. Network flows may also be referred to herein as flows. Code associated with the API 110 runs on the network element 102, allowing programmatic access to the capabilities of the switch, including reading and setting multiprotocol label switching (MPLS) tags, reading and modifying Layer 2 or Layer 3 information, deep packet inspection (DPI), updating routing tables, etc. In one embodiment, external applications use the SDK to coordinate with the management runtime on the network element 102 and via the communications channel. The external application may manipulate both the input filter and the switching/routing element efficiently and programmatically at least in some cases. Identified flows may then be sent to the external application for processing.

In some embodiments, such as those involving multi-tenant use, over-inclusive filters from a given user are prevented from catching flows from other users. To that end, an MPLS tag or similar identifier is used as a first filter that is AND'ed with any user-supplied input filters. The MPLS tag may be cryptographically matched with credentials provided by the external application when the external application connects to the network element 102 through the SDK, to prevent unauthorized tapping of flows from other users.

In one embodiment, when presented with a flow, the external application may elect whether to itself handle the flow or to register, through the SDK, a rule to govern disposition of the flow. If the application elects to itself handle the flow, then the flow continues on from the egress port of the device hosting the external application. Otherwise, the application may programmatically modify the routing, policy, or other rules associated with the flow. The SDK receives the modifications and marshals the modifications via the communications channel. The modifications are then interpreted at the internal network abstraction layer 308 and turned into commands or modifications at the service implementation layer 310. In turn, the services at the service implementation layer 310 control the flows at the hardware data plane level, thereby maintaining performance of the network element 102. At least in some embodiments, the application may arbitrarily alter the state of flows, packets, or configuration of the switch and according to rules encoded in the application by the developer.

Figure 4:
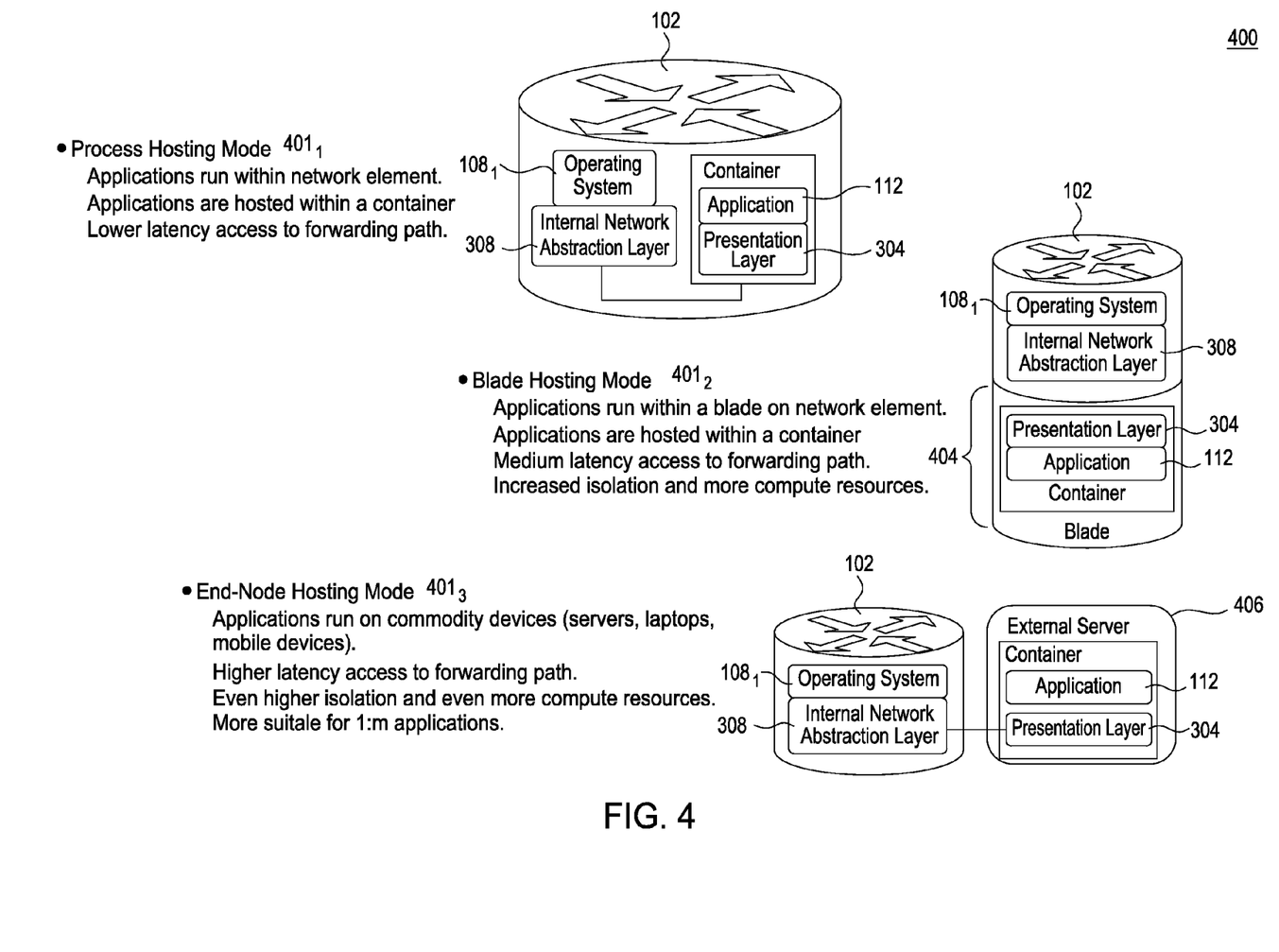
FIG. 4 is a diagram illustrating different deployment modes for extending routing rules from external services, according to one embodiment presented in this disclosure.

FIG. 4 is a diagram 400 illustrating different hosting modes for extending routing rules from external services, according to one embodiment presented in this disclosure. The hosting modes may also be referred to as deployment modes. As shown, the hosting modes include a process hosting mode $401_1$, a blade hosting mode $401_2$, and an end-node hosting mode $401_3$. In the process hosting mode $401_1$, the application 112 is hosted within a container and runs within the network element 102, which provides low latency access to the forwarding path. In the blade hosting mode $401_2$, the application 102 is hosted within a container and runs within a blade server 404 disposed within a same chassis as the network element 102, which provides medium latency access to the forwarding path. Doing so may provide increased isolation and additional compute resources at least in some cases, at least relative to the process hosting mode $401_1$.

In the end-node hosting mode $401_3$, the application 112 is hosted within a container and runs on an external server 406, which may be any commodity device such as a server, laptop, mobile device, etc. Doing so may provide high latency access to the forwarding path at least in some cases. Further, both isolation and compute resources may be further increased, at least relative to the blade hosting mode $401_2$. Accordingly, the communications abstraction provided between the application and the service framework allows the application to be deployed either on the switch in a separate process, in a blade within the same chassis as the switch, or on a separate computer or virtual machine (VM) altogether, including third-party computers or VMs.

Figure 5:
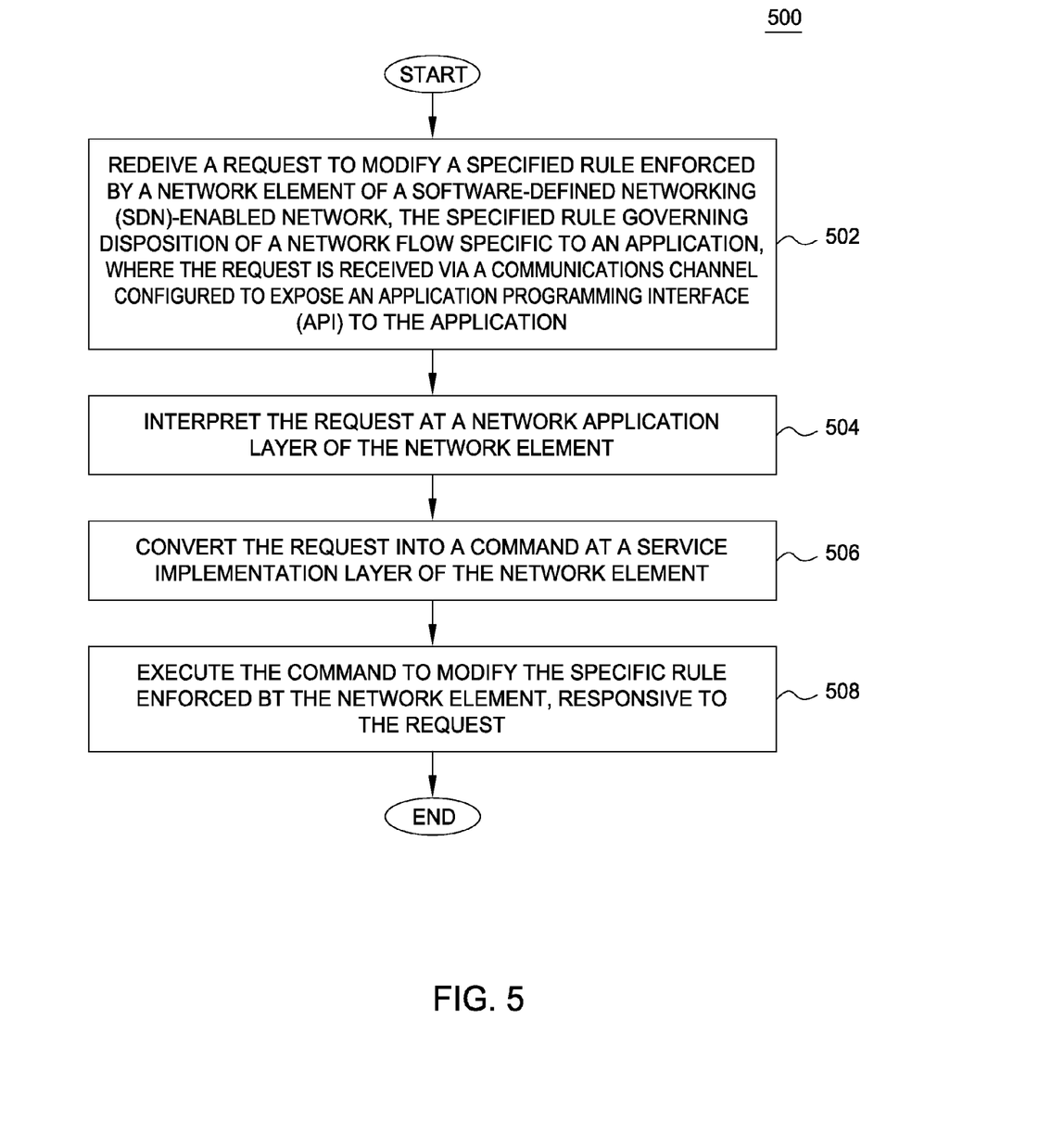
FIG. 5 is a flowchart depicting a method to extend routing rules from external services, according to one embodiment presented in this disclosure.

FIG. 5 is a flowchart depicting a method 500 to extend routing rules from external services, according to one embodiment presented in this disclosure. As shown the method 500 begins at step 502, where the network element 102 receives a request to modify a specified rule enforced by the network element 102. The specified rule governs disposition of a network flow specific to the application 112, which may include third-party code. The request may be received via the communications channel 210, which is configured to expose the API 110 to the application 112. At step 504, the network element 102 interprets the request at the internal network abstraction layer 308. At step 506, the network element 102 converts the request into one or more commands at the service implementation layer 310. At step 508, the network element 102 executes the one or more commands to modify the specified rule enforce by the network element 102, responsive to the request. After the step 508, the method 500 terminates.

In one embodiment, the API may be configured to allow the application to independently modify each individual management and runtime aspect of the network element 102, selected from MPLS tags, Layer-2 information, Layer-3 information, DPI, and routing tables. The request may be sent by the application 112 via the SDK 212 provided at the presentation layer 304 associated with the at least one network element 102. The SDK may be configured to marshal the request and send the marshaled request via the communications channel. As described above, in one embodiment, the communications channel may be a network-independent RPC channel. In such embodiments, the network element 102 may un-marshal the received request, prior to interpreting the request. The modified rule may be prevented from affecting at least one network flow not associated with a provider of the application 112. The specified rule may be modified by the management runtime of the network element 102. Depending on the embodiment, the application 112 may execute on the network element 102, on a blade server disposed within the same chassis as the network element 102, or on an external computer or VM operatively connected to the network element 102.

Accordingly, at least some embodiments disclosed herein provide techniques to extend routing rules from external services. One embodiment provides a coordinated service framework configured to allow manipulation of management and runtime aspects of a network element such as a switch or router. Together with the network-transparent communications channel, the coordinated service framework allows for external controllers or applications to control the disposition of packets and flows and in various use case scenarios, including multi-tenant environments and third-party application code. Consequently, cloud hosts may provide such applications on top of any network configured according to the techniques disclosed herein. Further, enterprise customers may extend their networks in arbitrarily ways by using the techniques disclosed herein.

In some cases, the relationship between the external application and the underlying hardware and runtime, which involves separation of management and policy planes, may be analogous to a separation between the data plane and a standalone controller in context of SDN. However, what can be managed from the external application may be much broader at least in some cases and may encompass management, inspection, QoS, flow management, etc.

In one embodiment, any router or switch configured according to the techniques disclosed herein may advantageously become OpenFlow-enabled. OpenFlow control packets may be detected and diverted at the ingress port and diverted to an OpenFlow controller running on the network element, on a blade server in the same chassis, or even on another host. The OpenFlow controller application may use the SDK to programmatically change the routing/switching element in accordance with OpenFlow directives, even when the network element itself may not necessarily support OpenFlow. Externally, it appears as if the network element indeed supports OpenFlow.

In another embodiment, load-balancing provided as a service may allow a load-balancing ruleset to run on a third-party VM and may support any arbitrary ruleset, including those of other vendors. The VM may be controlled by the third-party and use the SDK to affect the flows across a number of network elements. Because only the flows associated with the third party is diverted to the load-balancing service of the third party, multiple third parties may participate in providing respective rules for their respective flows, thereby providing multi-tenant control of the network flows on the hardware.

Figure 6:
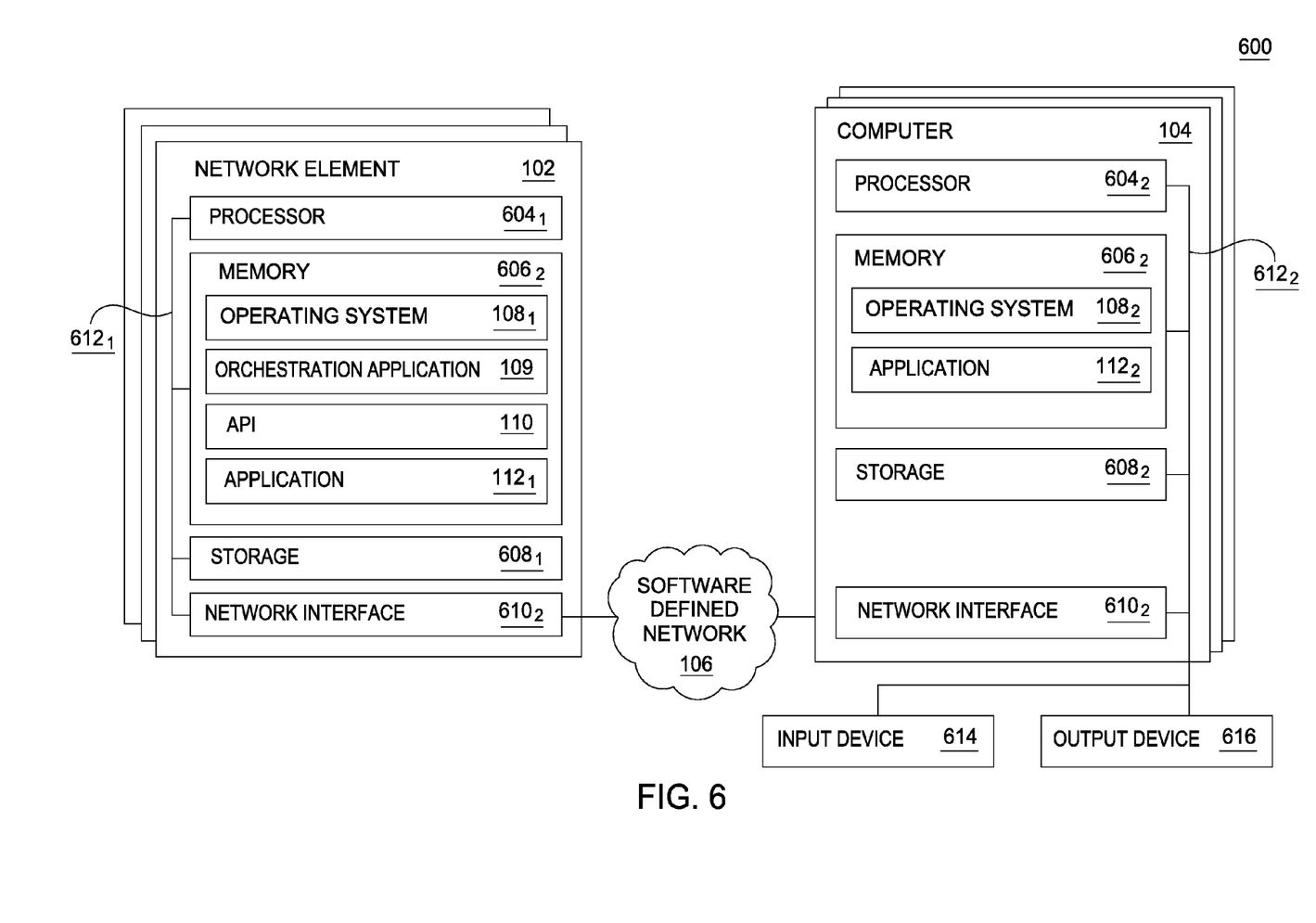
FIG. 6 is a block diagram illustrating components of a networked system 600 to extend routing rules from external services, according to one embodiment presented in this disclosure.

FIG. 6 is a block diagram illustrating components of a networked system 600 to extend routing rules from external services, according to one embodiment presented in this disclosure. The networked system 600 one or more network elements 102 and one or more computers 104 communicably connected via the software defined network 106. Each network element 102 and computer 104 generally includes a processor 604 operatively connected via a bus 612 to a memory 606, a network interface device 610, a storage 608. Other components may be connected, such as the input device 614 and an output device 616 of the computer 104.

Each network element 102 and computer 104 is generally under the control of an operating system. Examples of operating systems include the UNIX® operating system, distributions of the Linux® operating system, and the NX-OS operating system by Cisco Systems® of San Jose, Calif.

More generally, any operating system supporting the functions disclosed herein may be used. At least in some embodiments, the operating system $108_1$ of the network element 102 is different from the operating system $108_2$ of the computer 104.

Each processor 604 is included to be representative of a single CPU, multiple CPUs, a single CPU having multiple processing cores, and the like. Similarly, each memory 606 may be a random access memory. While each memory 606 is shown as a single identity, it should be understood that each memory 606 may comprise a plurality of modules, and that each memory 606 may exist at multiple levels, from high speed registers and caches to lower speed but larger DRAM chips. Each network interface device 610 may be any type of network communications device allowing the network element 102 or computer 604 to communicate with other nodes via the software defined network 106.

Each storage 608 may be a persistent storage device. Although each storage 608 is shown as a single unit, each storage 608 may be a combination of fixed and/or removable storage devices, such as fixed disc drives, solid state drives, floppy disc drives, tape drives, removable memory cards or optical storage. Further, the memory 606 and the storage 608 may be part of one virtual address space spanning multiple primary and secondary storage devices.

The input device 614 may be any device for providing input to the computer 604. For example, a keyboard and/or a mouse may be used. The output device 616 may be any device for providing output to a user of the computer 604. For example, the output device 616 may be any display screen or set of speakers. Although shown separately from the input device 614, the output device 616 and input device 614 may be combined. For example, a display screen with an integrated touch-screen may be used.

As shown, the memory 606 of the network element 102 includes the orchestration application 109, which is configured to provide at least one API 110. Depending on the embodiment, the application 112 may execute on the network element 102, on a blade within a same chassis as the network element 102, or on the computer 104. The application 112 may also use the SDK associated with the API in order to programmatically access management and runtime aspects of the network element 102 via the computer 104.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a developer may configure an external service to use an API provided by a network element in the cloud. Doing so allows the developer to extend routing rules from the external service executing on any computing system attached to a network connected to the cloud (e.g., the Internet).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A computer-implemented method to control network flow disposition in a multi-tenant environment, the computer-implemented method comprising:

receiving, from a first of a plurality of applications external to a software-defined networking (SDN)-enabled network, a request to modify a specified rule of a plurality of rules enforced by at least one network element of the SDN-enabled network, wherein each of the plurality of rules is modifiable by request from a respective one of the plurality of applications and governs disposition of a respective network flow specific to the respective application in the multi-tenant environment, the at least one network element having a presentation layer, a network abstraction layer, and a service implementation layer, the presentation layer providing a software development kit (SDK) associated with a predefined application programming interface (API);

marshalling the request by the SDK, wherein the marshalled request is transmitted via a predefined communications channel of the at least one network element, the predefined communications channel configured to expose the API to the first application;

un-marshalling the transmitted request upon receipt;

interpreting the un-marshalled request at the network abstraction layer of the at least one network element;

converting the interpreted request into one or more commands at the service implementation layer of the at least one network element; and executing the one or more commands by operation of one or more computer processors, in order to modify the specified rule enforced by the at least one network element, responsive to the request from the first application external to the SDN-enabled network.

2. The computer-implemented method of claim 1, wherein the API is configured to permit the first application to modify one or more management and runtime aspects of the at least one network element.

3. The computer-implemented method of claim 2, wherein the API is configured to permit the first application to independently modify each individual management and runtime aspect selected from a plurality of management and runtime aspects including multiprotocol label switching (MPLS) tags, Layer-2 information, Layer-3 information, deep packet inspection (DPI), and routing tables.

4. The computer-implemented method of claim 3, wherein the request is sent by the first application via the SDK, wherein the SDK is configured to communicate with a data path process via local inter-process communication, wherein the data path process is configured to access functionality of the at least one network element via virtual network service data path and generic routing encapsulation.

5. The computer-implemented method of claim 4, wherein control of network flow disposition is facilitated in the multi-tenant environment with arbitrary, third-party code, wherein the first application includes the arbitrary, third-party code, wherein the one or more commands are specific to a platform type of the at least one network element, wherein the request is independent of the platform type of the at least one network element, wherein the predefined communications channel comprises a network-independent remote procedure call (RPC) channel;

wherein the plurality of management and runtime aspects further include discovery, topology, element, interface, external configuration, system log, tracing, routing, quality of service, access control list, external service, datapath policy, and authentication, authorization and accounting, wherein each individual management and runtime aspect is modifiable.

6. The computer-implemented method of claim 5, wherein the at least one network element further comprises an application layer, a thrift layer and an operating system target layer, wherein the at least one network element comprises at least one hardware network element;

wherein the application layer includes the plurality of applications, each application of which is of a different application types, wherein the presentation layer includes a respective presentation interface for each application type, wherein the thrift layer includes the predefined communications channel and further includes a marshaling and transport component, wherein the network abstraction layer includes a network abstraction interface;

wherein the service implementation layer includes code associated with the API and code for configuring the at least one network element, wherein the operating system target layer includes platform-dependent code specific to each of a plurality of different network element types;

wherein the computer-implemented method further comprises:

preventing the modified rule from affecting at least one network flow not associated with a provider of the first application.

7. The computer-implemented method of claim 6, wherein the at least one network element is associated with a session manager having a service framework, wherein the predefined communications channel exposes the service framework to the first application, wherein the session manager has a corresponding module for each of a plurality of APIs supported by the at least one network element, wherein the service framework comprises a plurality of components including a session handler, a pluggable transport component, a session event/high availability component, a notification handler, a locking service, a version handler, an access control component, and a service registry component;

wherein each individual management and runtime aspect is modified, wherein the specified rule is modified by a management runtime of the at least one network element, wherein the specified rule is modifiable responsive to receiving the request from each of:

(i) a first instance of the first application executing on a first of the at least one network element;

(ii) a second instance of the first application executing on a blade server disposed within a same chassis as the first network element;

(iii) a third instance of the first application executing on a computer operatively connected to the first network element, and (iv) a fourth instance of the first application executing on a virtual machine (VM) operatively connected to the first network element.

8. The computer-implemented method of claim 1, wherein the API is configured to permit the first application to modify at least one aspect of the at least one network element, wherein the at least one aspect is selected from multiprotocol label switching (MPLS) tags, Layer-2 information, Layer-3 information, deep packet inspection (DPI), and routing tables.

9. The computer-implemented method of claim 1, wherein the at least one network element further comprises at least one of an application layer and an operating system target layer.

10. The computer-implemented method of claim 1, the at least one network element further having a thrift layer that includes the predefined communications channel.

11. A non-transitory computer readable medium containing a program which, when executed, performs an operation to control network flow disposition in a multi-tenant environment, the operation comprising:

receiving, from a first of a plurality of applications external to a software-defined networking (SDN)-enabled network, a request to modify a specified rule of a plurality of rules enforced by at least one network element of the SDN-enabled network, wherein each of the plurality of rules is modifiable by request from a respective one of the plurality of applications and governs disposition of a respective network flow specific to the respective application in the multi-tenant environment, the at least one network element having a presentation layer, a network abstraction layer, and a service implementation layer, the presentation layer providing a software development kit (SDK) associated with a predefined application programming interface (API);

marshalling the request by the SDK, wherein the marshalled request is transmitted via a predefined communications channel of the at least one network element, the predefined communications channel configured to expose the API to the first application;

un-marshalling the transmitted request upon receipt;

interpreting the un-marshalled request at the network abstraction layer of the at least one network element;

converting the interpreted request into one or more commands at the service implementation layer of the at least one network element; and executing the one or more commands by operation of one or more computer processors when executing the program, in order to modify the specified rule enforced by the at least one network element, responsive to the request from the first application external to the SDN-enabled network.

12. The non-transitory computer readable medium of claim 11, wherein the API is configured to permit the first application to modify one or more management and runtime aspects of the at least one network element.

13. The non-transitory computer readable medium of claim 11, wherein the API is configured to permit the first application to modify at least one aspect of the at least one network element, wherein the at least one aspect is selected from multiprotocol label switching (MPLS) tags, Layer-2 information, Layer-3 information, deep packet inspection (DPI), and routing tables.

14. The non-transitory computer readable medium of claim 11, wherein the at least one network element further comprises at least one of an application layer and an operating system target layer.

15. The non-transitory computer readable medium of claim 11, the at least one network element further having a thrift layer that includes the predefined communications channel.

16. A system to control network flow disposition in a multi-tenant environment, the system comprising:
   one or more computer processors;
   a memory containing a program which, when executed by the one or more computer processors, performs an operation comprising:
      receiving, from a first of a plurality of applications external to a software-defined networking (SDN)-enabled network, a request to modify a specified rule of a plurality of rules enforced by at least one network element of the SDN-enabled network, wherein each of the plurality of rules is modifiable by request from a respective one of the plurality of applications and governs disposition of a respective network flow specific to the respective application in the multi-tenant environment, the at least one network element having a presentation layer, a network abstraction layer, and a service implementation layer, the presentation layer providing a software development kit (SDK) associated with a predefined application programming interface (API);
   marshalling the request by the SDK, wherein the marshalled request is transmitted via a predefined communications channel of the at least one network element, the predefined communications channel configured to expose the API to the first application;
   un-marshalling the transmitted request upon receipt;
   interpreting the un-marshalled request at the network abstraction layer of the at least one network element;
   converting the interpreted request into one or more commands at the service implementation layer of the at least one network element; and
   executing the one or more commands; in order to modify the specified rule enforced by the at least one network element, responsive to the request from the first application external to the SDN-enabled network.

17. The system of claim 16, wherein the API is configured to permit the first application to modify one or more management and runtime aspects of the at least one network element.

18. The system of claim 16, wherein the API is configured to permit the first application to modify at least one aspect of the at least one network element, wherein the at least one aspect is selected from multiprotocol label switching (MPLS) tags, Layer-2 information, Layer-3 information, deep packet inspection (DPI), and routing tables.

19. The system of claim 16, wherein the at least one network element further comprises at least one of an application layer and an operating system target layer.

20. The system of claim 16, the at least one network element further having a thrift layer that includes the predefined communications channel.

* * * * *

UNITED STATES PATENT AND TRADEMARK OFFICE
CERTIFICATE OF CORRECTION

PATENT NO. : 9,509,549 B2  Page 1 of 1
APPLICATION NO. : 13/842786
DATED : November 29, 2016
INVENTOR(S) : Richard M. Pruss et al.

It is certified that error appears in the above-identified patent and that said Letters Patent is hereby corrected as shown below:

On the Title Page

Item (56), on the page 2, in Column 2, under "Other Publications", Line 9, delete "US201" and insert -- US2014 --, therefor.

In the Drawings

On sheet 5 of 7, in Figure 4, reference numeral $401_3$, Line 6, delete "suitale" and insert -- suitable --, therefor.

In the Specification

In Column 6, Line 8, delete "marshaling" and insert -- marshalling --, therefor.

In the Claims

In Column 13, Line 23, in Claim 6, delete "types," and insert -- type, --, therefor.

In Column 13, Line 27, in Claim 6, delete "marshaling" and insert -- marshalling --, therefor.

In Column 16, Line 9, in Claim 16, delete "commands;" and insert -- commands --, therefor.

Signed and Sealed this
Twenty-fifth Day of April, 2017

Michelle K. Lee
*Director of the United States Patent and Trademark Office*